US011669927B2

(12) United States Patent
De Corte et al.

(10) Patent No.: US 11,669,927 B2
(45) Date of Patent: Jun. 6, 2023

(54) PROVIDING UNIQUE CODES ON PACKAGES FOR LIQUID FOOD

(71) Applicant: Tetra Laval Holdings & Finance S.A., Pully (CH)

(72) Inventors: Paolo De Corte, Modena (IT); Gustavo Barros, Modena (IT); Matteo Gazzadi Poggioli, Modena (IT); Paolo Scarabelli, Reggio Emilia (IT); Claudio Donati, Modena (IT); Stefano Vicini, Vignola (IT); Mimi Axelsson, Modena (IT); Gaetano Cutrona, Vigarano Mainarda (IT)

(73) Assignee: Tetra Laval Holdings & Finance, S.A., Pully (CH)

( * ) Notice: Subject to any disclaimer, the term of this patent is extended or adjusted under 35 U.S.C. 154(b) by 231 days.

(21) Appl. No.: 16/979,625

(22) PCT Filed: Mar. 7, 2019

(86) PCT No.: PCT/EP2019/055654
§ 371 (c)(1),
(2) Date: Sep. 10, 2020

(87) PCT Pub. No.: WO2019/175003
PCT Pub. Date: Sep. 19, 2019

(65) Prior Publication Data
US 2021/0042870 A1    Feb. 11, 2021

(30) Foreign Application Priority Data

Mar. 14, 2018 (EP) .................................... 18161668

(51) Int. Cl.
*G06Q 50/28* (2012.01)
*G06Q 30/06* (2023.01)
*G06V 30/224* (2022.01)

(52) U.S. Cl.
CPC ............. *G06Q 50/28* (2013.01); *G06Q 30/06* (2013.01); *G06V 30/2247* (2022.01)

(58) Field of Classification Search
CPC .. G06Q 50/28; G06Q 10/0833; G06Q 10/083; H04L 63/0428
See application file for complete search history.

(56) References Cited

U.S. PATENT DOCUMENTS

| 2008/0011841 A1 | 1/2008 | Self |
| 2008/0046263 A1 | 2/2008 | Sager |

(Continued)

FOREIGN PATENT DOCUMENTS

| CN | 1264882 A | * | 8/2000 |
| CN | 102194173 B | * | 4/2014 |

(Continued)

OTHER PUBLICATIONS

Extended Search Report received in Application No. 19161178.9 dated Jul. 11, 2019.

(Continued)

*Primary Examiner* — Christle I Marshall
(74) *Attorney, Agent, or Firm* — Knobbe, Martens, Olson & Bear, LLP

(57) ABSTRACT

Unique codes for marking packages for liquid food are generated with a header portion (40) containing non-encrypted code-definition data ([E], [G]) that represents the code structure and/or the code generation methodology, and a payload portion (41) containing encrypted payload data ([EP]). The encryption ensures that the code is sufficiently scrambled to make guessing and fraudulent code generation difficult. The payload data, before encryption, may be defined to be unique in each code, thereby also rendering the code unique. The payload data, before encryption, may also be structured so as to enable efficient search for the code in (Continued)

a database. When read from a package, the code may be processed by extracting the code-definition data ([E], [G]), identifying the payload portion (41), extracting the encrypted payload data ([EP]), re-creating the payload data by decryption, and searching the database for the code based on the payload data or one or more subsets thereof.

25 Claims, 6 Drawing Sheets

(56) References Cited

U.S. PATENT DOCUMENTS

| | | |
|---|---|---|
| 2008/0075073 A1 | 3/2008 | Swartz |
| 2009/0065568 A1* | 3/2009 | Grant ................ G06Q 10/087 235/375 |
| 2010/0299263 A1 | 11/2010 | Grant |
| 2015/0379524 A1* | 12/2015 | Løken ................ G06Q 30/0185 705/318 |
| 2016/0371512 A1 | 12/2016 | Hattrup |

FOREIGN PATENT DOCUMENTS

| | | | |
|---|---|---|---|
| CN | 105139057 A | * | 12/2015 |
| CN | 105184083 A | * | 12/2015 |
| CN | 106250941 A | * | 12/2016 |
| JP | 2003-022377 A | | 1/2003 |
| JP | 2017-520216 A | | 7/2017 |
| WO | WO 2015/197494 A1 | | 12/2015 |

OTHER PUBLICATIONS

International Search Report and Written Opinion received in Application No. PCT/EP2019/055654 dated May 2, 2019.

* cited by examiner

| | FIELD | VALUE | #BITS |
|---|---|---|---|
| [A] | Producer ID | [1...4095] | 12 |
| [A] | Plant ID | [1...255] | 8 |
| [A] | Line ID | [1...63] | 6 |
| [A] | Equipment ID | [0...7] | 3 |
| [B] | Year | [0...7] | 3 |
| [B] | Day | [1...366] | 9 |
| [B] | Hour | [0...23] | 5 |
| [B] | Minute | [0...59] | 6 |
| [B] | Second | [0...59] | 6 |
| [B]/[C] | Package Counter | [0...63] | 6 |

| | FIELD | VALUE | #BITS |
|---|---|---|---|
| [A] | Production Unit ID | [0...999] | 10 |
| [D] | Master Generator Server | [0...1] | 1 |
| [B] | Year | [0...7] | 3 |
| [B] | Month | [1...12] | 4 |
| [B]/[C] | Request Number | [0...524287] | 19 |
| [B]/[C] | Package Counter | [0...134217727] | 27 |

PROVIDING UNIQUE CODES ON PACKAGES FOR LIQUID FOOD

TECHNICAL FIELD

The present invention relates generally to manufacture of packages for liquid food, and in particular to providing codes on such packages.

BACKGROUND

Every day across the world, billions of litres of water, milk, juice and other liquid foods are consumed. A large proportion of the liquid food is distributed in paper-based packages, also known as carton packages. These packages are produced to protect both the nutritional value and the taste of the liquid food inside. The underlying technology greatly facilitates packaging and distribution of liquid food products across the world.

It is well-known to provide this and other types of packages for liquid food with codes, e.g. to indicate an expiry date or an origin for the liquid food in the respective package. Such codes are often applied in plain text on the packages so that they may be read and understood by consumers.

To date, there is no widely adopted, optimal and robust technique for providing codes on packages to uniquely identify each individual package containing liquid food.

SUMMARY

It is an objective of the invention to at least partly overcome one or more limitations of the prior art.

Another objective is to provide a technique that enables packages to be provided with globally unique codes.

A further objective is to provide such a technique that mitigates the risk of fraudulent generation of valid codes and/or impedes efforts to guess a valid code based on another code or by usage of random mechanisms.

One or more of these objectives, as well as further objectives that may appear from the description below, are at least partly achieved by a method of generating codes, a computer-readable medium, a code, a system and a method of processing a code according to the independent claims, embodiments thereof being defined by the dependent claims.

A first aspect of the invention is a method of generating codes to uniquely identify packages for liquid food. The method comprises: obtaining code-definition data representing at least one of a structure of the codes and a methodology of generating the codes; obtaining payload data that is unique to each package; operating a predefined encryption algorithm on the payload data to generate the encrypted payload data; including the code-definition data in a predefined header portion for non-encrypted data of the code for a respective package; and including the encrypted payload data in a predefined payload portion of the code for the respective package.

Additionally, in some embodiments, said operating the predefined encryption algorithm comprises: selecting an encryption key, and the method further comprises including key-identification data that represents the selected encryption key into the predefined header portion.

Additionally, in some embodiments, said selecting the encryption key comprises: obtaining a random number, and selecting, based on the random number, the encryption key among a predefined set of encryption keys, wherein the key-identification data represents the selected encryption key.

Additionally, in some embodiments, the key-identification data further represents a version number of the predefined set of encryption keys.

Additionally, in some embodiments, the selected encryption key is a private key.

Additionally, in some embodiments, the methodology represented by the code-definition data comprises the predefined encryption algorithm.

Additionally, in some embodiments, the method further comprises operating a hash function on the encrypted payload data to generate hash data, and including the hash data as a readable sub-portion of the header portion.

Additionally, in some embodiments, the hash data is generated as a digital signature.

Additionally, in some embodiments, the method further comprises obtaining location data that represents a geographic location, and including the location data in the payload data so as to be common to all packages originating from a production unit at the geographic location.

Additionally, in some embodiments, the location data is indicative of at least one of a producer, a factory, a production line, and a production equipment.

Additionally, in some embodiments, the method further comprises obtaining indexation data that enables grouping of sequentially generated codes, and including the indexation data in the payload data.

Additionally, in some embodiments, said obtaining the indexation data comprises: obtaining a current value of at least one sequential counter which is configured to output sequential values that are either incremented or decremented over time.

Additionally, in some embodiments, the indexation data is obtained to include a combination of current values that are output by a plurality of sequential counters.

Additionally, in some embodiments, at least part of the indexation data is obtained to represent a current time.

Additionally, in some embodiments, the method further comprises obtaining random data for each package, and including the random data in the payload data.

Additionally, in some embodiments, said obtaining the random data comprises obtaining a random value from a randomized counter which is operated to intermittently arrange values belonging to a predefined range of mutually unique values in a random order, and then output at least a subset of the values one by one in the random order.

Additionally, in some embodiments, the method further comprises obtaining random value for each package from a randomized counter which is configured to generate random values that belong to a predefined range and are mutually unique within a predefined time period which is a minimum time unit for the current time, and including the random value in the payload data.

Additionally, in some embodiments, the codes are generated subject to a batch generation request, and the at least one sequential counter comprises a batch counter, wherein the method further comprises either incrementing or decrementing the batch counter for each batch generation request, and wherein said obtaining the indexation data further comprises obtaining a current value of the batch counter.

Additionally, in some embodiments, the at least one sequential counter comprises a package counter, wherein the method further comprises incrementing or decrementing the package counter for each package, and wherein said obtaining the indexation data further comprises obtaining a current value of the package counter.

Additionally, in some embodiments, the method is performed by a first code generator included in a group of identical code generators, said method further comprises obtaining redundancy data that distinguishes the first code generator from other code generator(s) in the group, and including the redundancy data in at least one of the header portion and the payload data.

Additionally, in some embodiments, the encrypted payload data and the code-definition data are included in the code as a respective sequence of binary values.

Additionally, in some embodiments, the method further comprises marking the package with the code.

Additionally, in some embodiments, said marking comprises: embedding the code into a data carrier on one of the packages for the liquid food, on a sheet material to be formed into a container portion of said one of the packages, or on an element to be combined with the container portion.

Additionally, in some embodiments, said marking further comprises: converting the code into a format adapted for embedding into the data carrier.

Additionally, in some embodiments, said marking comprises: controlling a printer or an ablation device to mark a surface portion, or storing the code in an electronic tag for wireless identification.

Additionally, in some embodiments, the method further comprises storing the code in a database, wherein the database and/or a partition of the database is selected for storing based on the payload data of the code.

A second aspect of the invention is a computer-readable medium comprising computer instructions which, when executed by a processor, cause the processor to perform the method of the first aspect or any of its embodiments.

A third aspect of the invention is a code generated by the method of the first aspect or any of its embodiments.

A fourth aspect of the invention is a system comprising at least one device configured to perform the method of the first aspect or any of its embodiments.

A fifth aspect of the invention is a method of processing the code generated by the method of the first aspect or any of its embodiments after reading the code from a package. The method comprises: extracting the code-definition data from the code; identifying the payload portion based on the code-definition data; extracting the encrypted payload data from the code; operating a predefined decryption algorithm on the encrypted payload data to generate the payload data; and searching a database for the code based on the payload data, or one or more subsets thereof.

A sixth aspect of the invention, which is applicable to all embodiments in which the above-mentioned hash data is included in the header portion, is a method of processing a code after reading the code from a package. The method comprises: extracting the hash data from the header portion of the code, extracting the encrypted payload data from the payload portion of the code, operating the hash function on the encrypted payload data to generate current hash data, and rejecting the code if the current hash data differs from the hash data. Other objectives, as well as features, aspects and advantages of embodiments of the present invention will appear from the following detailed description, from the attached claims as well as from the drawings.

DETAILED DESCRIPTION OF EXAMPLE EMBODIMENTS

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Well-known functions or constructions may not be described in detail for brevity and/or clarity. Unless otherwise defined, all terms (including technical and scientific terms) used herein have the same meaning as commonly understood by one of ordinary skill in the art to which this invention belongs.

Figure 1A:
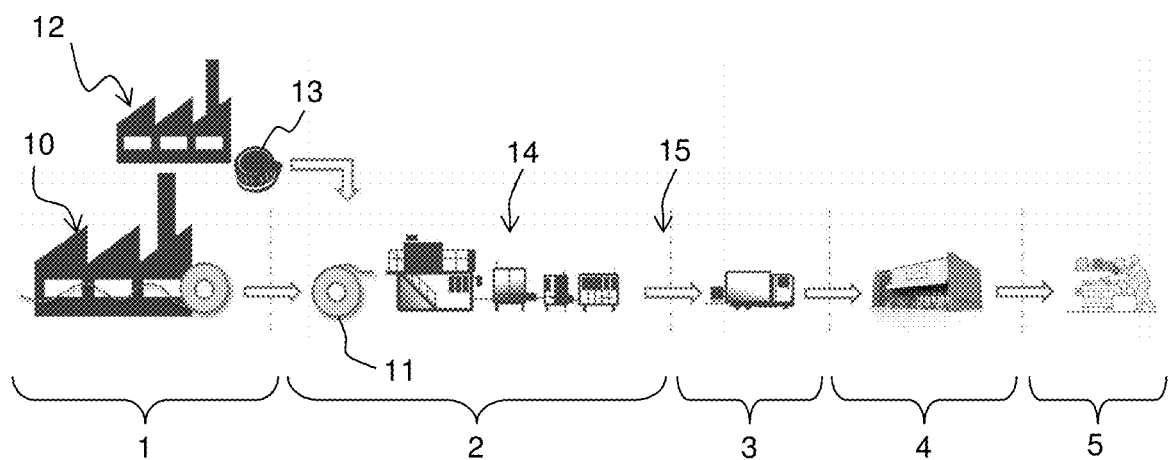
FIG. 1A is an overview of a manufacturing and distribution chain for packages for liquid food.

FIG. 1A is a schematic illustration of a manufacturing and distribution chain for packages for liquid food. Liquid food is any food product that is non-solid or pourable at room temperature, including beverages, such as fruit juices, wines, beers, sodas, as well as dairy products, sauces, oils, creams, custards, soups, etc, and also solid food products in a liquid, such as beans, fruits, tomatoes, stews, etc. The illustrated chain comprises a manufacturing stage 1 for manufacturing raw material for the packages, a filling stage 2 for manufacturing packages containing with liquid food, a distribution stage 3 for distributing the packages containing liquid food, a retail stage 4 for providing the packages to consumers, and a consumer stage 5 in which the packages are handled by a consumer and the liquid food is consumed.

In the manufacturing stage 1, a sheet material for the packages is manufactured at a converting factory (plant) 10. The sheet material is typically paper-based and provided to the filling stage 2 in rolls 11. In the illustrated example, stage 1 further involves a dedicated factory (plant) 12 that manufactures caps 13 for the packages, typically of plastic material. If the packages are formed without a cap, the factory 12 is absent from stage 1. It is also conceivable that stage 1 includes additional factories that manufacture specific components for the package.

Figure 1B:
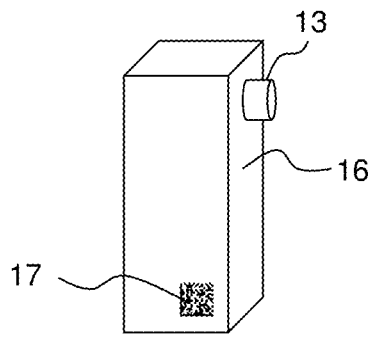
FIG. 1B is a schematic illustration of such a package.

In the filling stage 2, a filling factory (plant) 14 operates on the sheet material 11, the caps 13 and the liquid food to provide packages containing liquid food. For example, a production line at the filling plant 14 may form the sheet material 11 into a container, fill the liquid food into the container, and seal the container to form the package. The production line may also attach a cap 13 to the container. FIG. 1B shows an example of a package 16 produced by the filling plant 14. Stage 2 may further comprise external handing 15 of packages, e.g. palletizing, before entering the distribution stage 3.

It should be understood that the manufacturing chain generally may involve many different converting plants 10, cap plants 12 and filling plants 14, which may be distributed globally. Each of the plants 10, 12, 14 may include a plurality of production lines.

The present Applicant has identified a need to mark each package containing liquid food with a unique code. Each code should thus be unique within the entire eco-system of plants 10, 12, 14 within the manufacturing chain as exemplified in FIG. 1A, at least for a predefined lifetime. The code may be applied to the package in either of the plants 10, 12, 14 shown in FIG. 1A. For example, codes may be applied by the converting plant 10 at predefined positions on the sheet material 11 so as to be located on each of the packages 16 produced by filling plant 14. In another example, a code may be applied by the cap plant 12 to each cap 13. In a further example, a code is applied to the sheet material 11, the cap 13, the intermediate container or the package 16 by the filling plant 14. It is to be understood that the package 16 may contain more than one such unique code, e.g. one on the cap 13 and one on the package 16. It is also conceivable that a unique code is provided to the packages, or groups of packages, at the subsequent handling 15 (e.g. palletizing).

The code is applied to the package 16 as embedded in a data carrier 17, shown in FIG. 1B, which may be implemented by any known technique for providing an article of manufacture with a code. In one example, the data carrier 17 is printed onto the package 16, e.g. as sequence of human-readable symbols (e.g. characters), or a machine-readable graphical symbol such as one or more bar codes or a 2D code (DataMatrix, QR code, etc). In another example, the data carrier is an electronic tag, in which the code is stored and made available for retrieval by wireless communication with the tag, e.g. in accordance to any conventional standard for this purpose, such as NFC, RFID, BLE, etc.

The provision of a unique code on each package enables many different applications, including tracking and tracing the packages throughout the manufacturing and distribution chain (FIG. 1A), verifying the authenticity of the package, linking to web content related to the package for access by consumers or retail personnel, associating the codes with promotional campaigns and lotteries, causing automatic actions in machines that are used in stages 1-5 (FIG. 1A), such as any equipment in a filling plant 14, cooling systems in transportation vehicles, warehouse trucks, robots, refrigerators, etc.

Common to all such applications is that each generated code is not only marked on the package but also stored in a database, optionally in association with additional data. The database is accessed and searched for a particular code during execution of the application. It is realized that search speed is an important aspect for the implementation of the application. This is a challenging task in view of the large number of codes that will be generated, given the huge volumes of packages containing liquid food that are produced annually. For example, more than 188 billion ($10^9$) Tetra Pak® packages were sold in 2016.

The present Applicant has identified the following desirable features of the unique codes for the packages:

1) Enable very large numbers of unique codes, typically in excess of $10^{12}$
2) Enable a compact data carrier that fits on the smallest size of the packages produced within the eco-system
3) Minimize the risk of fraudulent code generation
4) Minimize risk of guessing a valid code
5) Enable fast rejection of false codes
6) Enable efficient and fast search for the codes in a database
7) Enable scalable code structure and code length
8) Enable robust and maintenance characteristics necessary for assuring a continuous and efficient global industrial operation on large scale One conceivable technique for generating the codes would be to generate each code as a number in a sequential number series. However, such a code will be unable to achieve at least features 3) and 4).

Another conceivable technique for generating the codes would be to generate each code as a random or pseudo-random number, with a length that enables the number of unique codes to greatly exceed the number of packages to be marked. While such a code may achieve features 3) and 4), it will be difficult to combine with features 5) and 6).

Embodiments of the present invention, to be exemplified in the following, are based on the insight that all of the features 1)-8) are enabled by generating the code to comprise a header portion and a payload portion, where the data in the payload portion is encrypted and the data in the header portion is not. The encryption ensures that the code is sufficiently scrambled to make guessing and fraudulent code generation difficult. Further, the data in the payload portion may be defined to be unique in each code before encryption, thereby also rendering the code unique. Still further, the data in the payload portion may be structured before encryption so as to enable efficient search for the code in a database. Still further, the header portion may further contain information to enable scalability in code structure and code length, information to enable fast rejection, information to enable decryption of the payload portion, etc.

Still further, the payload portion may be generated to represent, before encryption, properties of the production unit that adds the code to the package. For example, the payload portion may be indicative of at least one of the geographic location of the production unit (plant, production line, production equipment, etc.) and a time stamp for each package. This is a robust and transparent way of ensuring that the payload portion is unique within the eco-system.

Figure 2:
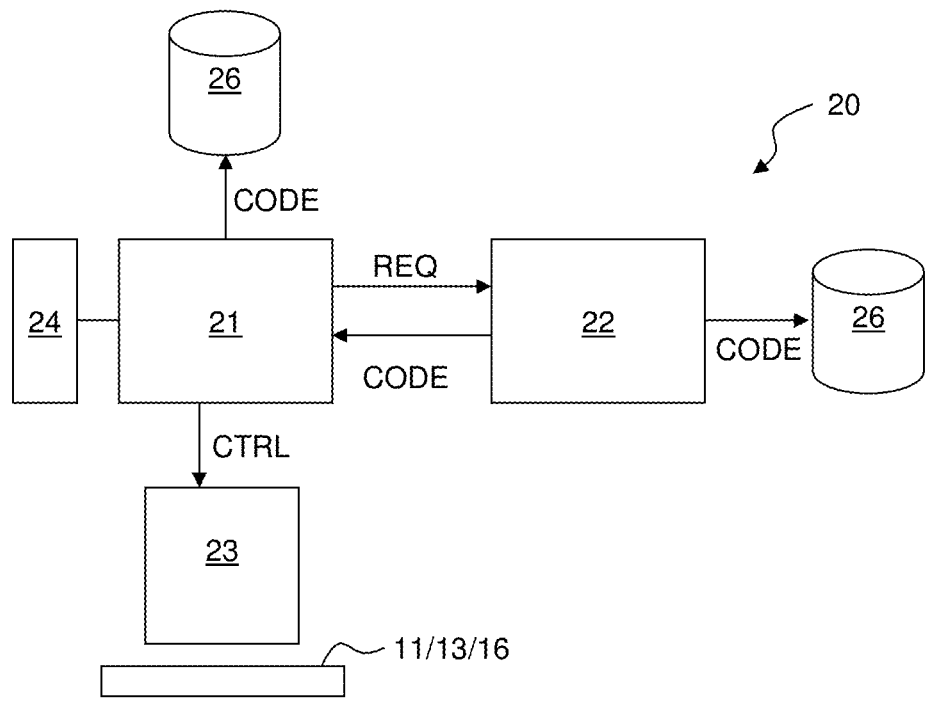
FIG. 2 is a block diagram of an example system for marking packages with unique codes in accordance with embodiments of the invention.

An example embodiment of a system 20 which is configured for code generation and marking of packages is schematically shown in FIG. 2. The system 20 includes a control unit 21, a code generator 22 and a marking device 23. The control unit 21 is configured to obtain codes (CODE) from the code generator 22 and generate control signals (CTRL) for causing the marking device 23 to provide the code to an article of manufacture, such as the sheet material 11, the cap 13 or the package 16. As understood from the foregoing, the marking device 23 may be a printer, an ablation device, or a device embedding the code into an electronic tag, which may be attached by the marking device 23 onto the article of manufacture or may be pre-attached thereto. In the illustrated example, the control unit 21 has or is connected to an input interface 24, which may comprise an MMI (man-machine interface) enabling an operator to manually enter input data and/or control the operation of the system. Alternatively, or additionally, the input interface 24 may comprise a receiver for receiving input data or control data from an external controller over a wired or wireless connection.

The control unit 21 is operable to generate a request (REQ) for one or more codes from the code generator 22 which generates, responsive to the request, the one or more codes and provides the code(s) to the control unit 21. The control unit 21 or the code generator 22 (as shown in FIG. 2) may be further configured to enter each code in a database 26, optionally in association with additional data. It is also conceivable that such additional data is added to the database 26 separately from the system 20.

The system 20 in FIG. 2 may be implemented for inline generation of codes or for offline (batch-wise) generation of codes. In such an inline embodiment, the codes are generated in real time during production in the plant 10, 12, 14 and the code generator 22 is typically located at the plant 10, 12, 14. The code generator 22 may be configured to return a single unique code for each incoming request REQ from the control unit 21. As used herein, a "request" denotes any type of signal that may cause the code generator to generate a code. In an offline embodiment, the control unit 21 transmits a request REQ to the code generator for a batch of codes in advance of production. Depending on implementation, the request may contain an identifier of the production unit (plant, production line, production equipment, etc.) and the number of codes to be generated. In response to the request, the code generator 22 generates and returns a batch of unique codes. In the offline embodiment, the code generator may, but need not, be located remotely from the production unit, e.g. in a network-connected server system which may be configured to generate and transmit codes, over a communication network, to different plants in the eco-system.

The Applicant presently contemplates to implement the inline embodiment in the filling plants 14, and the offline embodiment in the converting plants 10 and the cap plants 12.

Figure 3:
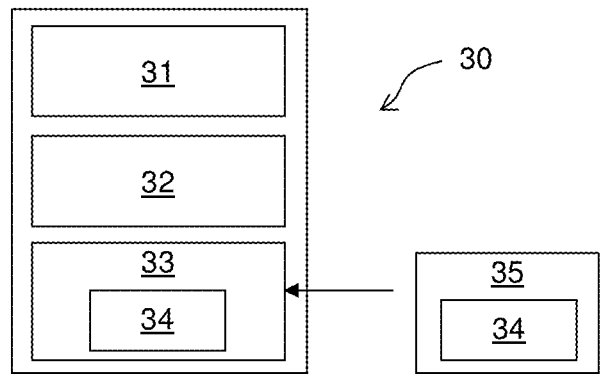
FIG. 3 is a block diagram of machine that implements one or more components of the system in FIG. 2.

FIG. 3 is a diagrammatic representation of a machine 30 that may represent the code generator 22. The machine 30 comprises a communication module 31 defining one or more interfaces for data communication in accordance with any suitable protocol or protocols. The machine 30 further comprises one or more processors 32, e.g. a central processing unit (CPU), a graphics processing unit (GPU), a digital signal processor (DSP), one or more application specific integrated circuits (ASICs), a field programmable gate array (FPGA), or any combination thereof. The machine 30 further comprises system memory 33, which may include computer memory in the form of volatile and/or non-volatile memory such as read only memory (ROM), random access memory (RAM) and flash memory. The memory 33 may store computer instructions 34 (e.g. software or program code) for causing the machine 30 to perform any one of the methodologies discussed herein. The instructions 34 may be supplied to the machine 30 on a computer-readable medium 35, which may be a tangible (non-transitory) product (e.g. magnetic medium, optical medium, read-only memory, flash memory, digital tape, etc) or a propagating signal. The instructions 34 might be protected by limited and restricted access using known methods. When executed by the processor 32, the instructions 34 may cause the processor(s) 32 to perform any one of the methodologies discussed herein. It should be understood that the control unit 21 may also be implemented by a corresponding machine 30, albeit with different computer instructions. It is also conceivable that the control unit 21 and the code generator 22 are jointly implemented on the machine 30.

It is conceivable to implement the code generator 22 by cloud computing, in which the functions of the code generator 22 are performed by resources on any number of co-operating computer systems or servers. In such an implementation, the co-operating computer systems jointly correspond to the machine 30 in FIG. 3.

Figure 4A:
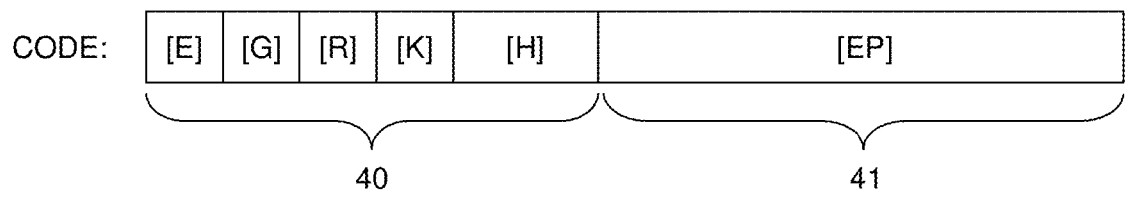
FIG. 4A illustrates an example structure of a code generated in accordance with embodiments of the invention.

FIG. 4A shows an embodiment of the structure of a code that is generated in accordance with the present invention. The code comprises a header portion 40 and a payload portion 41. The payload portion 41 holds encrypted payload data [EP]. The header portion 40 is non-encrypted and thus readable in the sense that its content is accessible without the need for an encryption key. However, it is conceivable that the header portion 40, or part thereof, is obfuscated. The term "obfuscation", sometimes denoted "obscuration" or "beclouding", refers to a process which is applied to a data set to intentionally make it difficult to access the data set if the algorithm applied by the process is unknown. On the other hand, the term "encryption" refers to a process which is applied to a data set to require a secret (e.g. a key) to enable access to the data set in a reasonable amount of time, even if the algorithm applied by the process is known.

In the example of FIG. 4A, the header portion 40 comprises five sub-portions that respectively hold encoding data [E], generator data [G], random key selector [R], key version [K] and hash data [H]. The encoding data [E] is code-definition data and has a fixed and predefined location and extent in all codes. The value of the encoding data [E] thus indicates the structure and length of the code, where a different value indicates a different structure and/or length. The structure may include the extent of the header and payload portions 40, 41, and the type, position and extent of the sub-portions that are included in the header portion 40. The provision of the encoding data [E] makes the code scalable in structure and length. The scalability is advantageous in that it enables the structure and length of the code to be adapted to match the encoding capabilities of a particular data carrier or to be adapted for eventual future unforeseen usages and applications. In a currently preferred embodiment, the encoding data [E] also indicates the location in the manufacturing chain for the plant that has marked the packages with the code, e.g. to differentiate between a converting plant 10, a cap plant 12 and a filling plant 14. The generator data [G] is also code-definition data and indicates how the code was generated, i.e. the procedures and steps that were followed. For example, the value of the generator data [G] may indicate if the code originates from an inline or offline embodiment, the encryption algorithm (cipher) that was used, etc. The provision of the generator data [G] increases the versatility of the code generation process. The random key selector [R] designates the encryption key that was used for encrypting the payload data. The provision of the random key selector [R] makes it possible to make a random selection among a predefined set of encryption keys when generating the code. This improves security by enabling use of different encryption keys between codes, and also introduces variability into the header portion 40 to make it even more difficult to crack the code and the code generation process. The key version [K] designates the version of the predefined set of encryption keys used in the code generation process. The provision of the key version [K] makes it possible to update the predefined set of encryption keys for improved security with backward and forward compatibility. The hash data [H] is or comprises a hash value of the encrypted payload in the payload portion 41. The provision of the hash data [H] enables fast rejection of false codes and thereby reduces the need to search for codes in the database, even if the fast rejection may wrongly approve a certain amount of false codes. By use of the hash data [H], which is readable directly from the header portion 40, the fast rejection is made without decryption of the encrypted payload [EP]. In one embodiment, the hash data [H] is or comprises a digital signature. The provision of a digital signature enables authentication of the code and thereby enables fast rejection of false codes with high accuracy.

It should be noted that both [R] and [K] need to be known to identify the encryption key that was used for generating a particular code. Thus, [R] and [K] jointly form "key-identification data". However, it is to be noted that the code may alternatively be generated without [R], if only a single encryption key is used, and/or without [K], if only a single version of the key or keys is used.

Although not shown in FIG. 4A, the header portion 40 may include additional data, e.g. a hyperlink. It should also be noted that neither the header portion 40 nor the payload portion 41 need to be contiguous portions in the code, as shown. Instead the header portion 40 may be split into subsets that are alternated with the payload portion 41 or subsets thereof. However, it is currently believed that the structure in FIG. 4A optimizes both the code generation and the processing of a code that is read from a package.

In the following examples, the code is generated as a sequence of binary values (bits). In a presently preferred embodiment, which is not limiting to the invention, the code consists of 80 bits, where the header portion 40 contains 16 bits and the payload portion 41 contains 64 bits. In this non-limiting example, [E] is 2 bits, [G] is 1 bit, [R] is 2 bits (i.e. four different encryption keys in the predefined set), [K] is 2 bits (i.e. up to four different versions of the predefined sets), and [H] is 8 bits.

Figure 4B:
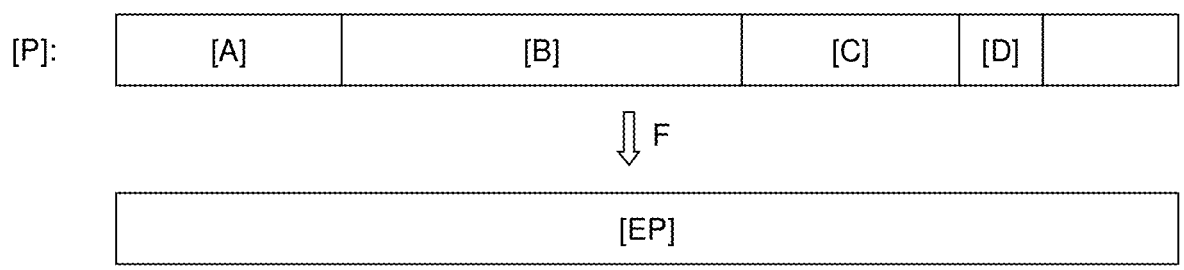
FIG. 4B illustrates an example structure of payload data and its use for generating encrypted payload data for the code.

FIG. 4B schematically illustrates a step of operating an encryption algorithm F on payload data [P] to generate encrypted payload data [EP] for inclusion in the payload portion 41 of a code. Any conceivable encryption algorithm F may be used, including any symmetric encryption algorithm in which a private encryption key is used for both encryption and decryption, and any asymmetric algorithm which utilizes pairs of public and private encryption keys. In one non-limiting embodiment, the encryption algorithm is a block cipher, such as Blowfish, DES, IDEA, RCS or AES. The encryption scrambles the payload data and obliterates its structure. Generally, the encryption serves to protect the data contained in the payload portion 41, to make it difficult to guess a valid code based on another code, and to minimize the risk of fraudulent code generation.

FIG. 4B also indicates various types of parameters that may be included in the payload data [P]. In the illustrated example, the payload data [P] comprises location data [A] that represents a geographic location, typically the geographic location of the production unit that adds the code to the package. It should be noted that the location data [A] may represent the geographic location indirectly, e.g. by indicating a certain producer, plant, production line or production equipment which has a known geographic location. In FIG. 4B, the payload data [P] further includes indexation data [B] that enables grouping of sequentially generated codes. As will be further exemplified below, the location data [A] and/or the indexation data [B] may serve to improve the speed of searching a database for the code. In FIG. 4B, the payload data [P] further comprises random data [C], which introduces an unpredictable variability to the payload data [P]. This unpredictable variability makes it even more difficult to reverse engineer the code and thus reduces the risk for fraudulent code generation.

Figure 11:
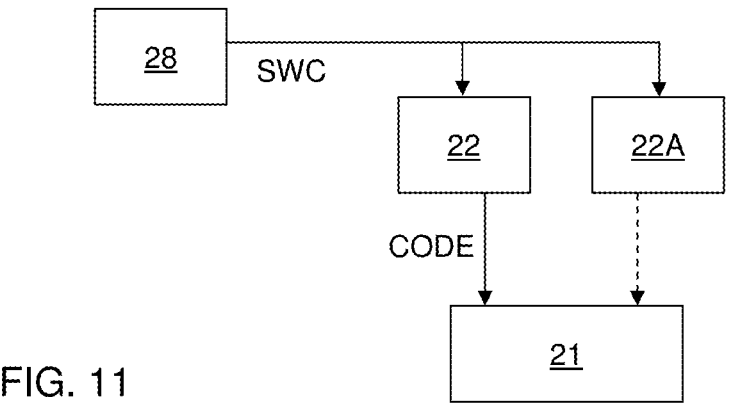
FIG. 11 is a block diagram of a variation of the system in FIG. 2.

In industrial environments in general, and especially high-volume production, standstills lead to costly loss of output and should be avoid. It may therefore be desirable to duplicate production equipment and enable so-called hot swapping, i.e. to be able to switch from a main equipment to a backup equipment essentially without any standstill in production. This also applies to the code generator in FIG. 2. FIG. 11 illustrates a variant of the system in FIG. 2 with two code generators 22, 22A. Although not shown in FIG. 11, the control unit 21 is connected to a marking device 23 like in FIG. 2. The code generators 22, 22A are structurally and functionally identical, which means that they use exactly the same methodology to generate codes with the same structure and length. Code generator 22 is used as a main generator and code generator 22A is a backup generator (as indicated by the dashed arrow). A controller 28 is connected to the code generators 22, 22A to control the switching from one to the other by a switch control signal (SWC). It may be difficult to synchronize the two code generators 22, 22A with sufficient precision when switching from one to the other to avoid that the same codes are generated by both code generators 22, 22A in connection with the switching. To overcome this problem, the payload data [P] further comprises redundancy data [D], as shown in FIG. 4B. The redundancy data [D] represents the particular code generator that has generated the code. Thus, the code generators 22, 22A are configured to enter different redundancy data [D] into the code. Thereby, the codes that are generated by the code generators 22, 22A will inherently differ and hot swapping is made possible without the risk for generating duplicated codes. The hot swapping may e.g. be made in case of malfunction of the main code generator 22 or for scheduled maintenance of the main code generator 22. In addition to enabling hot swapping, the provision of redundancy data [D] also enables two or more code generators to be operated in parallel to provide codes to the control unit 21.

In a variant, the redundancy data [D] is instead or additionally included in the header portion 40.

As a further comment to FIG. 4B, it may be noted that the payload data [P] includes an empty box to indicate that the payload data [P] may contain additional data.

Figure 5:
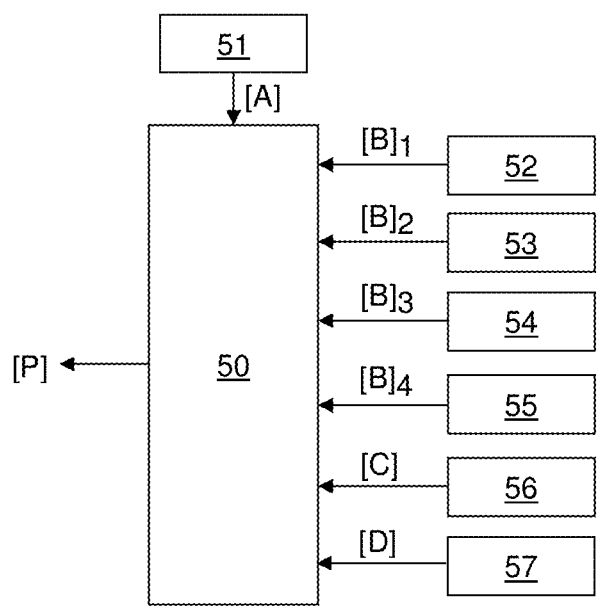
FIG. 5 is a block diagram of a structure for generating payload data in accordance with embodiments of the invention.

FIG. 5 shows an example of a structure for generating the payload data [P], e.g. within the code generator (22 in FIG. 2). At the heart of the structure is a payload generator 50, which receives or acquires current data values from a set of data providers 51-57 and combines the data values into the payload data [P], e.g. structured as shown in FIG. 4B. The data provider 51 provides the above-mentioned location data [A]. In the above-mentioned inline embodiment, the location data [A] may be predefined and stored in memory. The data provider 51 may thus be a memory (cf. 33 in FIG. 3). In the above-mentioned offline embodiment, at least part of the location data [A] may be included in the batch request REQ received by the code generator 23 and the data provider 51 may be configured to retrieve the location data [A] from the batch request. In FIG. 5, sequential counters 52-55 provide respective portions $[B]_1$-$[B]_4$ of the indexation data [B]. As used herein, a "sequential counter" denotes a counter that outputs values in a predictable sequence. Specifically, each sequential counter 52-55 in FIG. 5 is operable to generate output values that are either incremented or decremented over time, from a start value to an end value. As used herein, "incremented" implies an increase (by any step), and "decremented" implies a decrease (by any step). In a non-limiting example, the sequential counters 52-55 output values that are incremented or decremented in steps of 1. Each counter 52-55 may also operate with a predefined modulo, so that the output value rolls over from the end value to the start value. The indexation data [B] is formed to comprise a combination of output values from the sequential counters 52-55, e.g. $[B]=[B]_1[B]_2[B]_3[B]_4$. The provision in the code of an output value of at least one sequential counter enables grouping of consecutive codes and will thereby enable grouped storage of codes in the database 26 (FIG. 2) and thereby facilitate search of the database. Each counter 52-55 may represent a physical quantity related to the manufacturing process at the production unit that adds the codes to the packages. In one example, one or more of the counters 52-55 may represent a time parameter for the manufacturing, such that the indexation data [B] contains a time stamp for the respective package. Groups of such time counters may operate jointly to represent the current time in different time units, such as one or more of year, month, week, day, hour, minute, second.

In another example, one of the counters 52-55 may be a package counter that outputs a count of the packages that are marked at the production unit. The package counter typically increments or decrements its output value from a start value without applying a predefined modulo. In the inline embodiment, the output value of the package counter may be incremented for each package that is marked (e.g., for each incoming REQ to the code generator 22 in FIG. 2). In a specific variant, the package counter is coordinated with a time counter, so as to be reset to its start value whenever the value of the time counter changes. Preferably, the time counter represents the smallest time unit among the available time counters. If the smallest time unit is a second, the output values of the package counter thereby provide a sub-second resolution and is reset each second. In the offline embodiment, the output value of the package counter may be incremented or decremented for each code that is generated in a batch of codes. Further examples of counters are given below with reference to FIGS. 7A-7B.

As understood from the foregoing, the sequential counters 52-55 may be incremented/decremented in synchronization with the code generation process, or independent thereof. Examples of synchronized operation include the above-mentioned change of the package counter for each package that is marked or each code that is generated. On the other hand, the above-mentioned time counters are automatically triggered to update their output values to represent the current time.

In the example of FIG. 5, a randomized counter 56 provides the random data [C]. The randomized counter 56 is operable to output random values within a predefined range and is preferably operated to change its output value in synchronization with the code generation process. In one embodiment, the randomized counter 56 is configured to provide random values without duplication within a predefined time period, i.e. the random values are mutually unique within the predefined time period. In one implementation, the randomized counter 56 may arrange all values belonging to a predefined range of mutually unique values in random order, and output the values, or a subset thereof, one by one in the random order. In a specific variant, the randomized counter 56 is coordinated with a time counter, to be reset (i.e. re-arrange the values in random order) whenever the value of the time counter changes. Preferably, the time counter represents the smallest time unit among the available time counters. If the smallest time unit is a second, the output values of the randomized counter 56 thereby provide a sub-second resolution. It is realized that such a randomized counter 56 may replace the above-described package counter with sub-second resolution in the inline embodiment.

The data provider 57 in FIG. 5 provides the above-mentioned redundancy data [D], which may be predefined and stored in memory. The data provider 57 may thus be a memory (cf. 33 in FIG. 3).

The above-mentioned counters 52-56 may be implemented by dedicated hardware, dedicated software, or a combination thereof. If the code generator is implemented on a computer, the time counters may be implemented by an existing support function on the computer, e.g. a support function included in the operating system.

Figures 6, 7A, 7B:
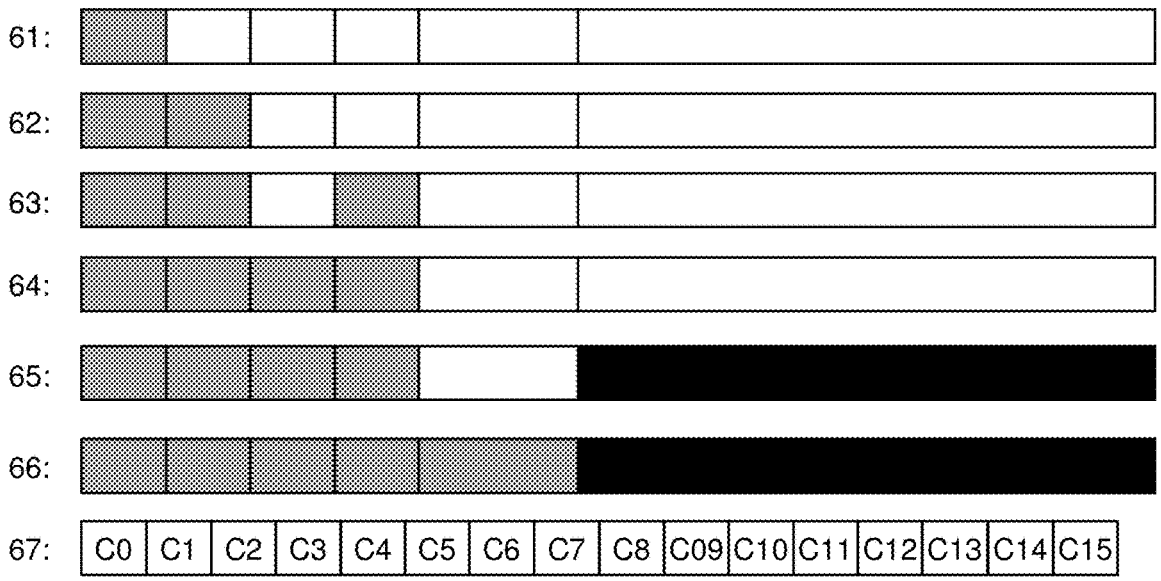
FIG. 6 illustrates example instances of a code during code generation.
FIGS. 7A-7B illustrate example parameters included in the payload data in accordance with embodiments of the invention.

FIG. 7A shows an example of parameters/data fields in the payload data [P] in an inline embodiment, e.g. when codes are generated at the filling plant 14 in FIG. 1. In the illustrated example, the location data [A] comprises Producer ID, Plant ID, Line ID and Equipment ID. The Producer ID identifies the producer that operates the filling plant 14. The Plant ID identifies the filling plant 14, the Line ID identifies the production line, and the Equipment ID identifies the equipment where the code is added to a package, e.g. a filling machine, a cardboard packer, or a palletizer. In the illustrated example, the code is designed to handle 4 095 different producers, 255 different plants for each producer, 63 lines within each plant, and 8 different equipments. In the illustrated example, the indexation data [B] represents the current time and comprises Year, Day, Hour, Minute and Second, where Year is given by the current year modulo 8. The values in the respective data field are generated by a respective time counter, as described with reference to FIG. 5. The payload data [P] also includes a Package Counter that provides sub-second resolution as described with reference to FIG. 5. The Package Counter value may either be included in the indexation data [B], if generated by a sequential counter (cf. counters 52-55 in FIG. 5), or be included in the random data [C], if generated by a randomized counter (cf. counter 56 in FIG. 5).

FIG. 7B shows an example of parameters/data fields in the payload data [P] in an offline embodiment, e.g. when codes are generated in batches on request by the converting plant 10 or the cap plant 12. In the illustrated example, the location data [A] comprises Production Unit ID, which identifies the plant. In the illustrated example, part of the indexation data [B] represents the current time and comprises Year and Month. The values of these parameters may be generated by a respective time counter, as described with reference to FIG. 5. The payload data [P] also comprises Request Number and Package Counter, which may also be indexation data [B] generated by a respective sequential counter. For example, the Request Number may be incremented or decremented for each batch request received from a certain plant (i.e. a given value of Production Unit ID), in the current Year and the current Month. To provide the Request Number, the structure in FIG. 5 may be seen to comprise one sequential batch counter for each plant, where the sequential batch counter is reset to its starting value (e.g. 0) whenever the Month counter rolls over to start counting from its start value. Similarly, the Package Counter may be incremented or decremented for each code that is generated in respect of a respective value of the Request Number, i.e. for a certain batch. To provide the Package Counter, the structure in FIG. 5 may be seen to comprise a sequential package counter for each batch counter, where the sequential package counter is reset to its starting value (e.g. 0) whenever the value of the associated batch counter changes. Alternatively, as indicated in FIG. 7B, at least one of the Request Number and the Package Counter may be random data [C]. The structure for generating random values of the Request Number and/or the Package Counter may be identical to the structure for generating sequential values of the Request Number and/or the Package Counter, as described above, except that each sequential counter is replaced by a randomized counter. The randomized counter for Request Number may be configured to be reset at each change of Month value, and the randomized counter for Package Counter may be configured to be reset at each change of Request Number value.

In the example of FIG. 7B, the code is designed to handle 1 000 different plants, more than 500 000 batch requests per month, and more than 134 million packages per request. In FIG. 7B, the payload data [P] also comprises redundancy data [D] in the form of Master Generator Server, which may be set to either 0 or 1.

Figure 8:
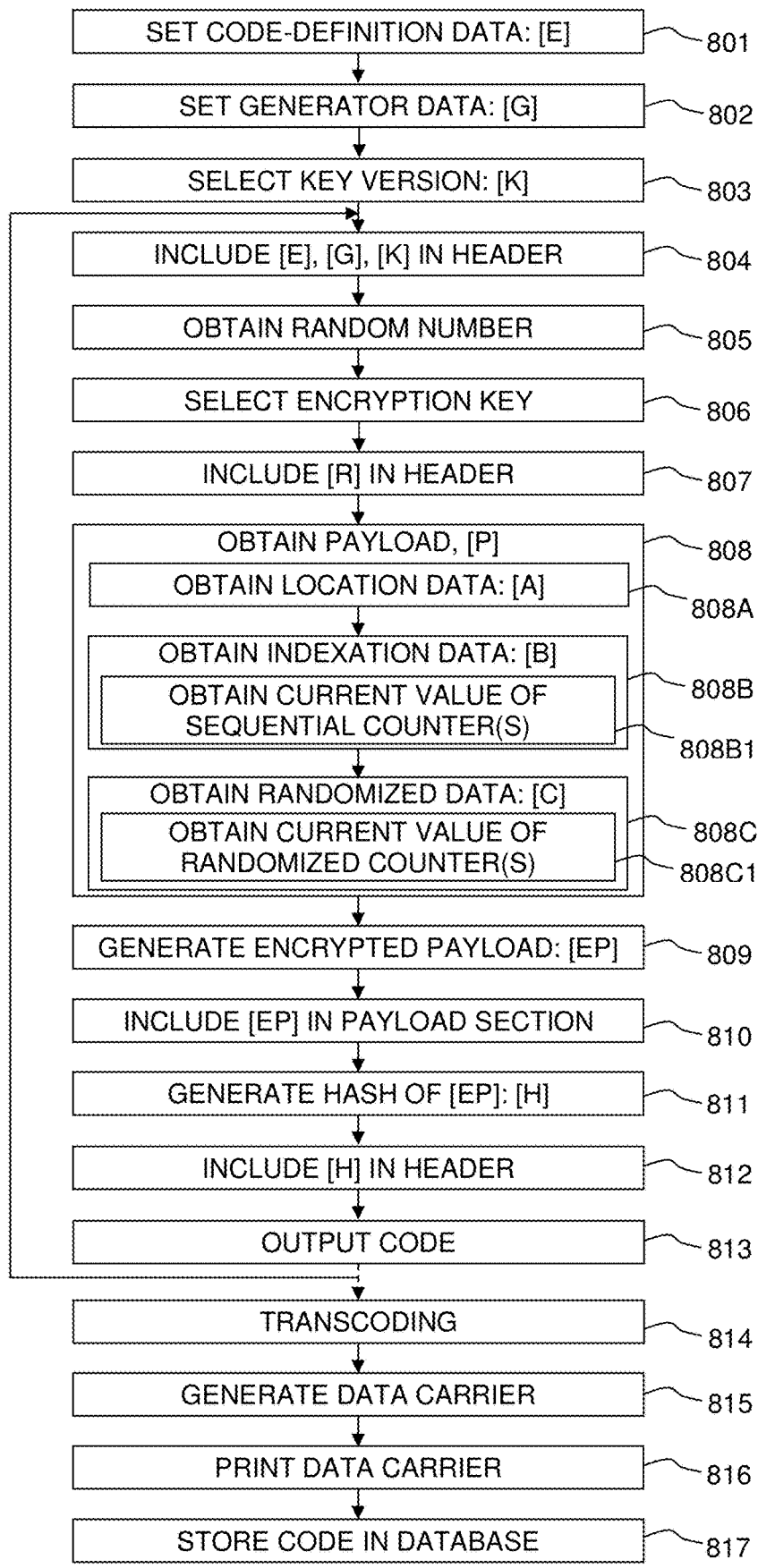
FIG. 8 is a flow chart of an example process for generating unique codes and marking packages in accordance with embodiments of the invention.

FIG. 8 is a flow chart of a process executed in the system of FIG. 2. The process involves one part for generating codes, corresponding to preparatory steps 801-803 and the subsequent steps 804-813 that are repeated for each code to be generated. Steps 801-813 are performed by the code generator 22 in the system of FIG. 2. The process also involves another part for adding the codes to the packages, corresponding to steps 814-816, which are performed by jointly by the control unit 21 and the marking device 23, which is a printer in this example. The process also involves a step 817 of storing the code in a database, where step 817 may be performed by either the control unit 21 or the code generator 22.

Looking at the preparatory steps in more detail, step 801 obtains a value for the encoding data [E] that corresponds to the structure and length of the code to be generated, step 802 obtains a value for the generator data [G] that corresponds to the procedures and steps to be followed when generating the code, and step 803 obtains a value for the key version [K] that corresponds to the current version of the encryption keys to be used for encrypting the payload data [P]. These values of [E], [G] and [K] will be entered into all codes that are generated during the present execution of the process. In step 804, the values of [E], [G] and [K] are included in the header portion 40 of the code. FIG. 6 illustrates instances 61-66 of the code during execution of the process in FIG. 8, where a filled portion/sub-portion indicates that it contains a value. It is realized that step 804 corresponds to instances 61, 62 and 63 in FIG. 6.

Subsequent steps 805-807 are performed to select an encryption key. Step 805 obtains a random number from a random number generator, which is preferably configured to generate cryptographically secure random numbers. Step 806 then selects, based on the random number, an encryption key among a predefined set of encryption keys, e.g. by use of a look-up table or function that provides an association between random numbers and encryption keys. In step 806, the predefined set of encryption keys is given by the key version [K]. Step 807 sets the random key selector [R] to represent the selected encryption key and includes [R] in the header portion 40 (instance 64 in FIG. 6). For example, the encryption keys in each version of the predefined set of encryption keys may be designated by a respective number, and step 807 may set the encryption key selector [R] to this number.

Step 808 obtains the payload data [P] and may be performed by the payload generator 50 in FIG. 5. In the illustrated example, step 808 includes a first sub-step 808A of obtaining the location data [A], a second sub-step 808B of obtaining the indexation data [B], and a third sub-step 808C of obtaining the random data [C]. As indicated, sub-step 808B may involve the action 808B1 of obtaining a current value of one of more sequential counters (cf. 52-55 in FIG. 5), and sub-step 808C may involve the action 808C1 of obtaining a current value of one of more randomized counters (cf. 56 in FIG. 5). Although not shown in FIG. 8, step 808 may also obtain redundancy data [D]. However, it should be noted that at least [C] and [D] are optional for the purpose of making the code unique within the eco-system. Step 808 also involves forming the payload data [P] by arranging [A]-[D], to the extent they have been obtained, in accordance with the current code structure. The process then proceeds to step 809, which operates the encryption function (F in FIG. 4B) on the payload data [P] to generate encrypted payload data [EP]. Step 810 includes [EP] in the payload portion 41 of the code (instance 65 in FIG. 6). Step 811 operates a hash function on [EP] to generate the hash data [H]. Any conceivable hash function may be used, e.g. a non-cryptographic hashing function such as Pearson hashing. Step 812 includes [H] in the header portion 40 (instance 66 in FIG. 6). The code is completed and step 813 outputs the code, whereupon the process returns to step 804 to generate another unique code.

Step 814 operates on each code that is output by step 813 to perform a transcoding thereof. As noted above, the code consists of a sequence of bit values. Transcoding involves converting the code into a format adapted for encoding into the data carrier. In the example of encoding a sequence of bit values into a 2D code, it is known to transcode the bit values into alphanumeric characters. As an example, instance 67 in FIG. 6 schematically indicates a sequence of alphanumeric characters C0-C15 resulting from the transcoding. Transcoding is well-known in the art of marking objects and will not be described in further detail. Step 815 generates a data carrier in the form a 2D code that represents the characters C0-C15, and step 816 prints the data carrier onto the sheet material, cap or package.

Figure 9:
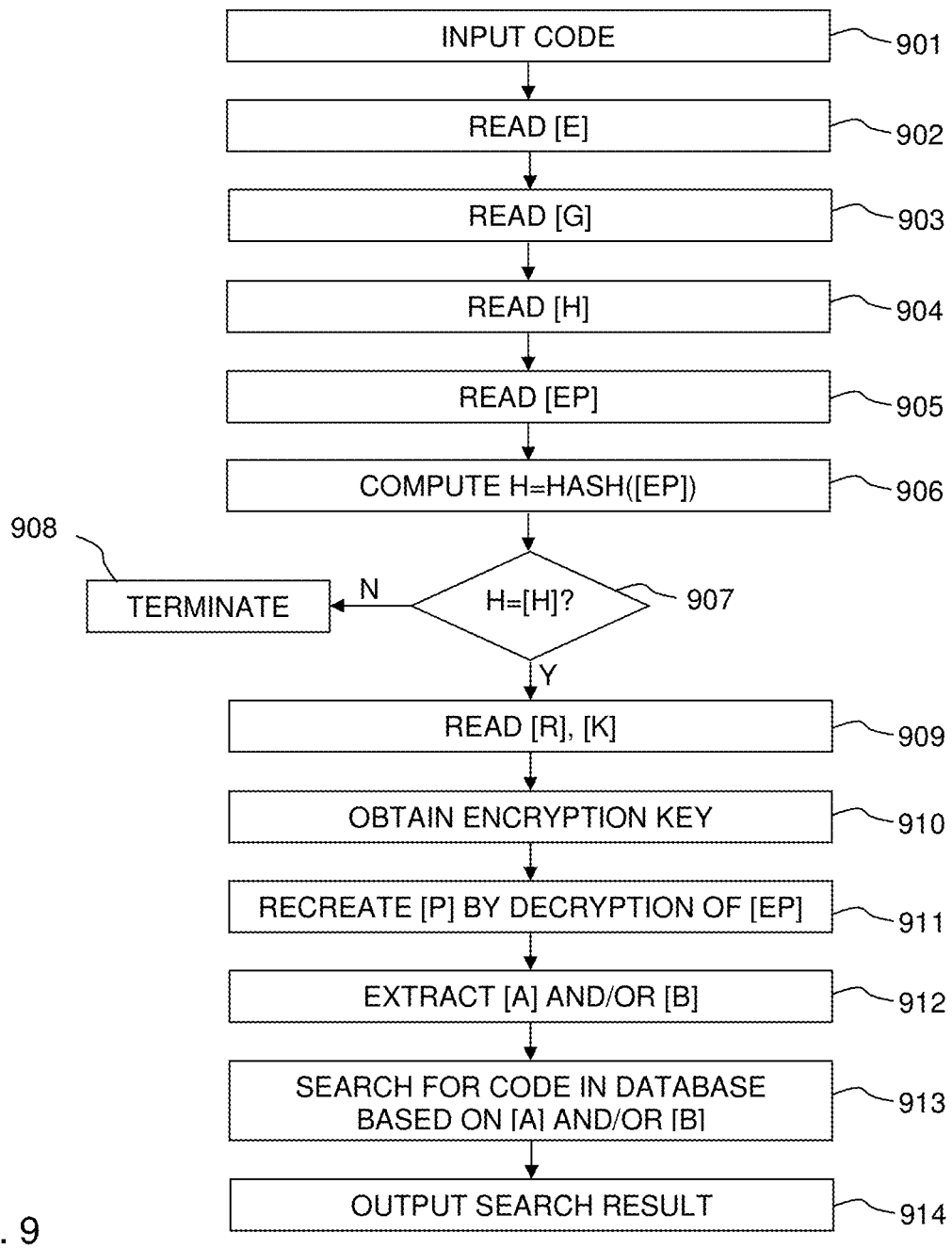
FIG. 9 is a flow chart of an example method of processing a code read from a package.

FIG. 9 is a flowchart of a method of processing the code that has been read off a package which has been marked with a code, for example by the process in FIG. 8, in accordance with an embodiment of the invention. Devices for reading different types of data carriers are well-known in the art and will not be described further. Depending on implementation, the reading may result in the code as originally generated, e.g. as a bit sequence, or the transcoded data, e.g. a sequence of alphanumerical characters, which is then subsequently transcoded back into the underlying, original code.

In the method of FIG. 9, step 901 inputs a code that has been read off a package. Step 902 reads the encoding data [E] from the code. As noted above, the encoding data [E] has a fixed and predefined location in all codes. Based on the value of [E], the location of all relevant portions and sub-portions in the code are known to the method. Subsequently, step 903 may then read the generator data [G] to determine the syntax of the code and any functions used when generating the code. The method then performs a fast rejection check of the code, by steps 904-907, where step 904 reads the hash data [H], step 905 reads the encrypted payload data [EP], step 906 computes a hash of [EP] by use of a predefined hash function, which may be fixed for all codes or identified based on [G], and step 907 compares the computed hash to [H]. If step 907 finds a mismatch, the method proceeds to step 908 which terminates the method. The code is thereby rejected. Otherwise the method proceeds to step 909, which reads the random key selector [R] and the key version [K] from the code. Based thereon, step 910 obtains the corresponding encryption key, whereupon step 911 decrypts [EP] by use of the encryption key and a predefined encryption algorithm, which may be fixed for all codes or identified based on [G]. Thereby, step 911 re-creates the payload data [P], and step 912 reads at least one of the location data [A] and the indexation data [B], or a specific data field in [A] and/or [B] (cf. FIGS. 7A-7B), from the payload data [P]. The resulting value or values allow step 913 to access and search a database for the code. Step 914 then outputs the search result, e.g. a confirmation that the code has been found, a message that the code was not found, any information associated with the code in the database, etc.

Figure 10A:
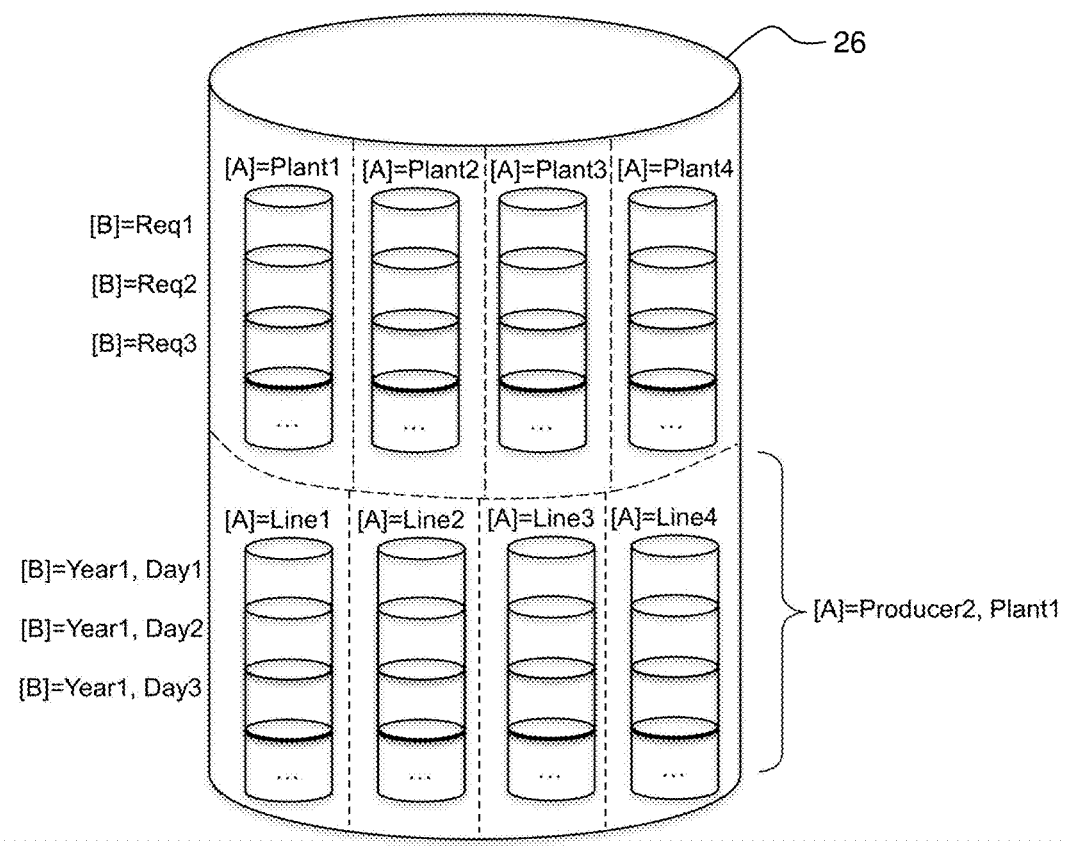
FIGS. 10A-10B show example database structures for storing codes generated in accordance with embodiments of the invention.

A few non-limiting examples of how access to location data [A] and/or indexation data [B] may improve database management and database search will now be given with reference to FIGS. 10A-10B. FIG. 10A shows an example of a database 26 that has been partitioned (indicated by dashed line) into a first partition for storing codes generated in an offline embodiment (top part) and a second partition for storing codes generated in an inline embodiment (bottom part). The first partition is sub-partitioned (indicated by dashed lines) by plant as given by the location data [A] (cf. Production Unit ID in FIG. 7B). In FIG. 10A, each such sub-partition includes a stack of cylinders where each cylinder represents a batch of codes generated for a respective batch request. Within the respective sub-partition, the batches are searchable by the indexation data [B]. For example, given the indexation data [B] in FIG. 7B, the codes in each batch contain the same combination of Year, Month and Request Number.

The second partition is sub-partitioned (indicated by dashed lines) by producer and plant as given by the location data [A] (cf. Producer ID and Plant ID in FIG. 7A). FIG. 10A illustrates a sub-partition for Plant1 of Producer2, which is further partitioned by production line as given by the location data [A] (cf. Line ID in FIG. 7A). Each such further partition includes a stack of cylinders where each cylinder represents a group of codes generated for a specific combination of production year and production day (cf. Year and Day in FIG. 7A). Thus, within the respective further partition, the groups are searchable by the indexation data [B].

Reverting to FIG. 8, it is realized that step 817 when transmitting codes for storage in the database 26 also preferably transmits values of [A] and/or [B] parameters that are relevant for storage of the codes in the particular database 26.

Based on FIG. 10A, the skilled person realizes that the provision of location data [A] and/or indexation data [B] allows a database to be configured with variable level of partition granularity adapted to the specific database constraints (dependent on implementation and provider).

Figure 10B:
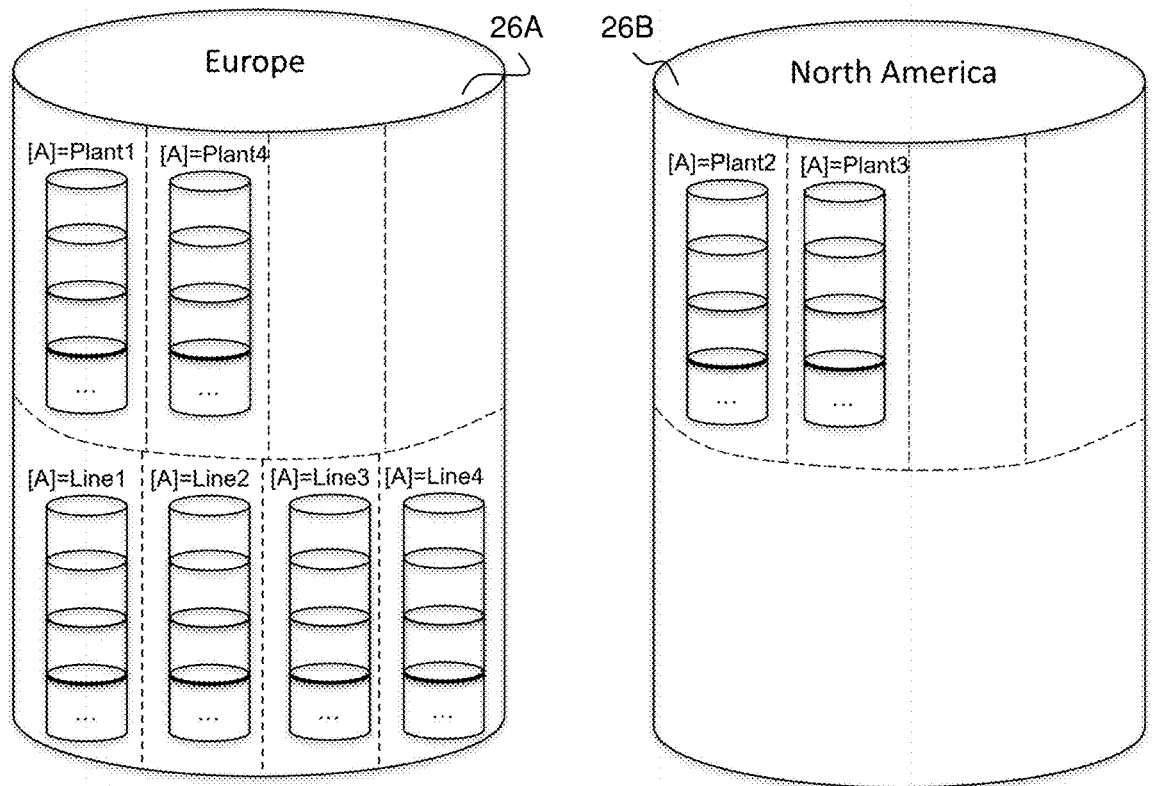

In the example of FIG. 10B, the database 26 in FIG. 10A has been separated into one database 26A storing codes for packages produced in Europe and one database 26B storing codes for packages produced in North America. The separation into Europe and North America is given by the geographic location of the respective plant.

Thus, as implied by FIG. 10B, the provision of location data [A] enables distributed storage that may further accelerate search by reducing data transmission time. Further, it also enables reduction of data storage volume per location with cost and performance advantages. It also provides an additional advantage in situations where data storage needs to be geographically localized to comply with national regulations/legislations.

The invention claimed is:

1. A method of generating codes to uniquely identify packages for liquid food, said method comprising:
    obtaining code-definition data representing at least one of a structure of a plurality of codes that uniquely identify packages for liquid food or a methodology of generating the plurality of codes,
    obtaining payload data that is unique to each package,
    operating a predefined encryption algorithm on the payload data to generate an encrypted payload data, wherein operating the predefined encryption algorithm comprises selecting an encryption key by;
    obtaining a random number, and
    selecting, based on the random number, the encryption key among a predefined set of encryption keys, wherein key-identification data represents the encryption key,
    including the code-definition data and the key-identification data in a predefined header portion for non-encrypted data of a code for a respective package for liquid food,
    including the encrypted payload data in a predefined payload portion of the code for the respective package, and
    marking the respective package for liquid food with the code.

2. The method of claim 1, wherein the key-identification data further represents a version number of a predefined set of encryption keys.

3. The method of claim 1, wherein the encryption key is a private key.

4. The method of claim 1, wherein the methodology represented by the code-definition data comprises the predefined encryption algorithm.

5. The method of claim 1, further comprising operating a hash function on the encrypted payload data to generate hash data, and including the hash data as a readable sub-portion of the predefined header portion.

6. The method of claim 5, wherein the hash data is generated as a digital signature.

7. The method of claim 1, further comprising obtaining location data that represents a geographic location, and including the location data in the payload data so as to be common to all packages originating from a production unit at the geographic location.

8. The method of claim 7, wherein the location data is indicative of at least one of a producer, a factory, a production line, or a production equipment.

9. The method of claim 1, further comprising obtaining indexation data that enables grouping of sequentially generated codes, and including the indexation data in the payload data.

10. The method of claim 9, wherein obtaining the indexation data comprises: obtaining a current value of at least one sequential counter which is configured to output sequential values that are either incremented or decremented over time.

11. The method of claim 10, wherein the indexation data is obtained to include a combination of current values that are output by a plurality of sequential counters.

12. The method of claim 9, wherein at least part of the indexation data is obtained to represent a current time.

13. The method of claim 9, further comprising obtaining random data for each package, and including the random data in the payload data.

14. The method of claim 13, wherein obtaining the random data comprises obtaining a random value from a randomized counter which is operated to intermittently arrange values belonging to a predefined range of mutually unique values in a random order, and then output at least a subset of the values one by one in the random order.

15. The method of claim 12, further comprising obtaining a random value for each package from a randomized counter which is configured to generate random values that belong to a predefined range and are mutually unique within a predefined time period which is a minimum time unit for the current time, and including the random value in the payload data.

16. The method of claim 10, wherein the codes are generated subject to a batch generation request, and wherein the at least one sequential counter comprises a batch counter, wherein the method further comprises incrementing or decrementing the batch counter for each batch generation request, and wherein obtaining the indexation data further comprises obtaining a current value of the batch counter.

17. The method of claim 10, wherein the at least one sequential counter comprises a package counter, wherein the method further comprises incrementing or decrementing the package counter for each package, and wherein obtaining the indexation data further comprises obtaining a current value of the package counter.

18. The method of claim 1, which is performed by a first code generator included in a group of identical code generators, wherein said method further comprises obtaining redundancy data that distinguishes the first code generator from other code generators in the group, and including the redundancy data in at least one of the predefined header portion and the payload data.

19. The method of claim 1, wherein the encrypted payload data and the code-definition data are included in the code as a respective sequence of binary values.

20. The method of claim 1, wherein said marking comprises: embedding the code into a data carrier on one of the respective package, a sheet material to be formed into a container portion of the respective package, or a cap to be combined with the container portion.

21. The method of claim 20, wherein said marking further comprises: converting the code into a format adapted for embedding into the data carrier.

22. The method of claim 1, wherein said marking comprises: controlling a printer or an ablation device to mark a surface portion, or storing the code in an electronic tag for wireless identification.

23. The method of claim 1, further comprising storing the code in a database, wherein at least one of the database or a partition of the database is selected for storing based on the payload data of the code.

24. A non-transitory computer-readable medium comprising computer instructions which, when executed by a processor, cause the processor to perform the method of claim 1.

25. A method of processing codes that uniquely identify packages for liquid food, said method comprising:
extracting code-definition data from a code marked on a package for liquid food,
identifying a payload portion of the code based on the code-definition data,
extracting an encrypted payload data from the payload portion of the code, the encrypted payload data generated by operating a predefined encryption algorithm on an unencrypted payload data, wherein operating the predefined encryption algorithm comprises selecting an encryption key by:
obtaining a random number, and
selecting, based on the random number, the encryption key among a predefined set of encryption keys,
operating a predefined decryption algorithm on the encrypted payload data to regenerate the unencrypted payload data, wherein operating the predefined decryption algorithm comprises selecting a decryption key corresponding to the encryption key, and
searching a database for the code based on the unencrypted payload data or one or more subsets thereof.

* * * * *